United States Patent [19]

Schiltz

[11] Patent Number: 4,824,312

[45] Date of Patent: Apr. 25, 1989

[54] GRAIN STORAGE UNLOADING SYSTEM

[76] Inventor: Boyd D. Schiltz, R.R. #2, Box 88, Wessington, S. Dak. 57381

[21] Appl. No.: 141,110

[22] Filed: Jan. 5, 1988

[51] Int. Cl.$^4$ .......................................... B65G 65/46
[52] U.S. Cl. ..................... 414/310; 198/668; 198/860.4; 198/370; 414/786; 414/326
[58] Field of Search ............... 414/310, 319, 320, 326, 414/786, 306, 307, 308, 309, 311, 312; 198/666, 667, 860.4, 370, 668

[56] References Cited

U.S. PATENT DOCUMENTS

| | | | |
|---|---|---|---|
| 797,100 | 8/1905 | Crosby | 198/668 |
| 2,393,572 | 1/1946 | Soma | 198/668 |
| 2,763,362 | 9/1956 | Greaves | 198/668 X |
| 3,151,749 | 10/1964 | Long | 414/310 |
| 3,344,533 | 10/1967 | Peterson | 34/230 |
| 3,358,856 | 12/1967 | Weibull | 214/17 |
| 3,487,961 | 1/1970 | Neuenschwander | 214/17 |
| 3,536,210 | 3/1970 | Dickinson | 214/17 |
| 3,563,399 | 2/1971 | Shivvers | 214/152 |
| 3,647,094 | 3/1972 | Jackson | 414/310 X |
| 3,755,918 | 9/1973 | Parrot | 34/236 |
| 3,765,547 | 10/1973 | Shivvers | 214/17 DA |
| 4,043,051 | 8/1977 | Lussenden | 34/77 |
| 4,220,433 | 9/1980 | Feterl | 414/298 |
| 4,599,809 | 7/1986 | Parkes | 34/31 |
| 4,619,577 | 10/1986 | Swanson | 414/310 X |

FOREIGN PATENT DOCUMENTS 2355747  1/1978  France ............... 414/310

OTHER PUBLICATIONS

Starline, Inc. "Silo Unloader for Fingertip Feeding".
Jamesway, "Volumatic Silo Unloader".
Automatic Feeding Systems Co., "Roto Matic Silo Unloader".
Brillion Iron Works, Inc. "Silo Unloaders Have . . . Features".
Badger Northland, Inc. "Silo Unloaders and Bunk Feeders".
Clay Equip. Corp. "Silo Unloader Feeder".
P&D Sales Co. "P&D Push Button Silo Unloader".
Olson Mfg. Co. "The Olson Silo Unload".
Keho Alta Products Ltd. Advertisement.

Primary Examiner—Robert J. Spar
Assistant Examiner—R. Katz
Attorney, Agent, or Firm—Merchant, Gould, Smith, Edell, Welter, & Schmidt

[57] ABSTRACT

A grain storage unloading system (10) with a series of augers for unloading grain (42) from a storage bin (11) is disclosed. Also disclosed is a method for unloading grain (42) from a storage bin (11). The system includes a horizontal discharge auger conveyer (20) disposed above the bin's floor, the outlet end (25) of the horizontal auger conveyer (20) communicating with a point outside the grain bin (11). The inlet end (24) of the horizontal auger conveyer is interconnected to a vertical auger conveyer (13). The present invention also includes a sweep auger (32), the length of the sweep auger (32) extending the radius of the grain bin, which transports grain (42) radially toward a central part of the bin (11).

7 Claims, 4 Drawing Sheets

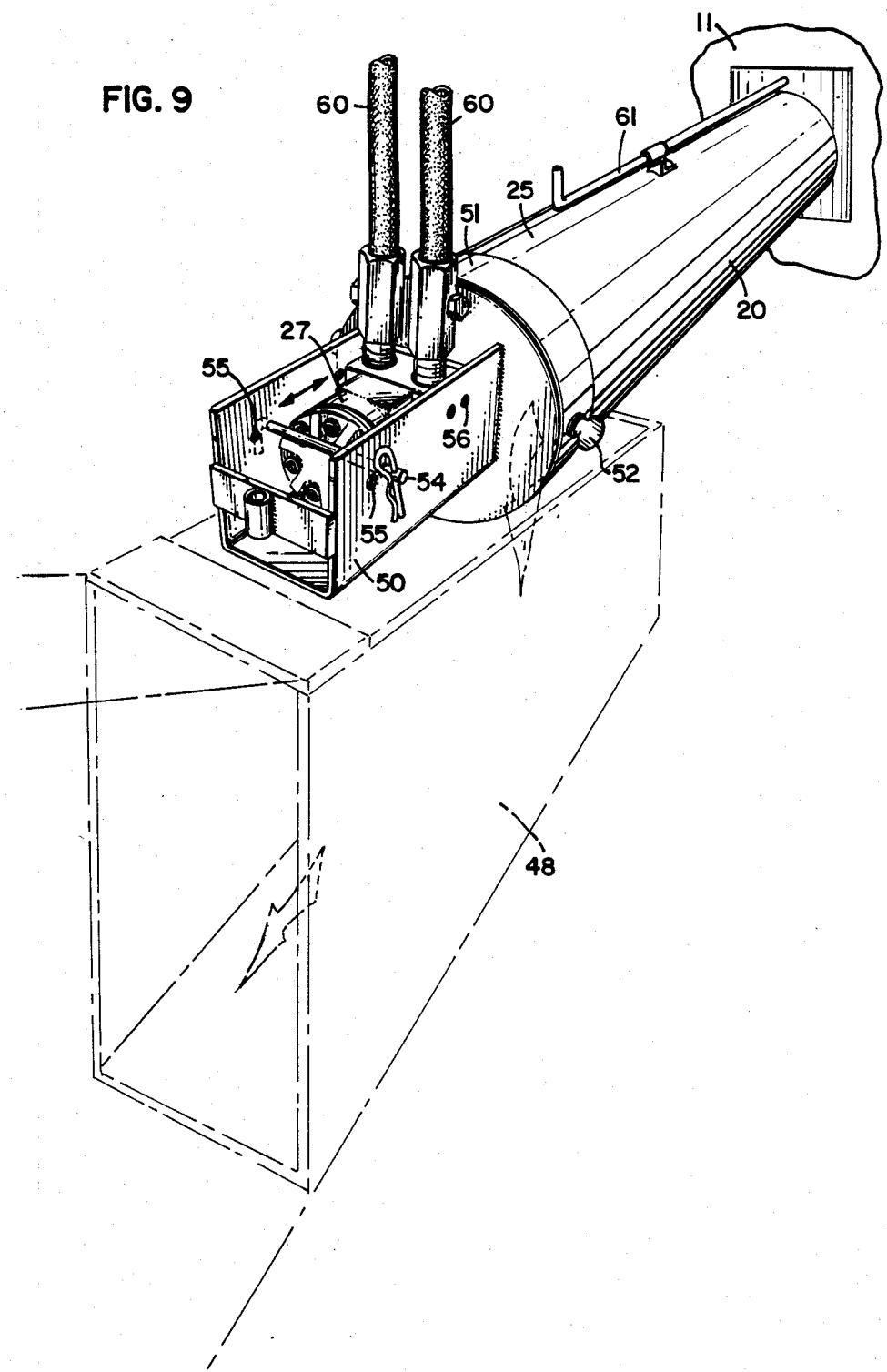

GRAIN STORAGE UNLOADING SYSTEM

FIELD OF THE INVENTION

The present invention relates generally to a grain bin unloading system and more particularly to a grain bin unloading system having an arrangement of several augers which can be installed above the floor of an existing grain bin.

BACKGROUND OF THE INVENTION

Conventional systems for unloading grain from bins have included auger-like devices. However, these systems are typically embedded beneath the floor of the grain bin to carry the grain from an opening in the floor to some point outside the bin. These auger systems therefore must be installed during construction of the grain bin itself. However, a large number of metal storage bins have been constructed on concrete slabs without any provision for such an unloading system. If a conventional auger unloading system were to be installed within an existing storage structure, considerable construction expense and inconvenience would be required to remove the existing floor, install the unloading system, and reconstruct the floor.

Another difficulty with conventional auger systems is that they are unduly complex in construction. They often require a separate power source and complicated gearboxes, resulting in additional expense and maintenance problems. The fact that the system is constructed underground also complicates maintenance efforts.

Further, conventional unloading systems typically require difficult and time-consuming labor. Shovelling of the grain is often necessary at various stages of the unloading process to completely unload the storage structure.

The present invention addresses these and many other problems associated with currently available grain unloading systems.

SUMMARY OF THE INVENTION

The present invention comprises a grain storage unloading system for unloading grain from a bin. The system includes a substantially horizontal discharge auger conveyer disposed above the grain bin's floor, the outlet end of the horizontal auger conveyer communicating with a point outside the grain bin. The inlet end of the horizontal auger conveyer is interconnected to a vertical auger conveyer which is supported upon and disposed above the slab floor. Means for supplying power to the horizontal auger conveyer and for transmitting the power to the vertical auger conveyer preferably comprise a motor and right angle gearbox respectively. In the preferred embodiment, a mini-sweep auger is connected to the lower end of the vertical auger conveyor via a stub auger in order to clear grain from the central portion of the grain bin and deliver the grain inwardly to the vertical auger. The present invention also includes a sweep auger having a length which extends the radius of the grain bin. The sweep auger revolves around the floor of the bin transporting grain radially toward a central part of the bin.

Another aspect of the invention is a method for unloading grain from a storage bin. The method includes the steps of installing the horizontal discharge auger conveyer and vertical auger conveyer within the bin and above the floor; loading the storage bin with grain; transporting grain out of the bin through the horizontal auger conveyer, the grain entering the horizontal auger conveyer at its inlet end by means of gravity; and transporting the remaining grain upward through the vertical auger conveyer and outward through the horizontal auger conveyer. Further steps of the inventive method include the transportation of the grain inwardly to the vertical auger by means of a floor auger.

The present invention is particularly advantageous in that it can be installed in an existing grain storage structure without extensive retrofitting. The entire auger unloading system is supported above the floor of the existing grain bin, and the exit spout of the unloading system extends through an aperture in the wall of the grain bin.

Another feature of the present invention is that it is simple in construction and inexpensive to manufacture. It utilizes a portable power source and features uncomplicated connections between the various augers.

The present invention also substantially reduces or eliminates the need for labor-intensive shovelling of grain. After a majority of the grain has been unloaded from the bin, the mini-sweep auger and the sweep auger automatically transport the remaining grain to the central part of the bin and into the unloading system so that the grain can be transported outside of the bin. The unloading system of the present invention also effectively unloads grain around the entire circumference of the bin, providing a 360° full circle unloading system.

For a better understanding of the invention, and of the advantages obtained by it use, reference should be had to the drawings and accompanying descriptive matter, in which there is illustrated and described a preferred embodiment of the invention.

BRIEF DESCRIPTION OF THE DRAWINGS

Referring particularly to the drawings, wherein like reference numerals indicate like parts throughout the several views:

FIG. 9 is a perspective view of the exit spout and motor support of the present invention.

DESCRIPTION OF THE PREFERRED EMBODIMENT

Figure 1:
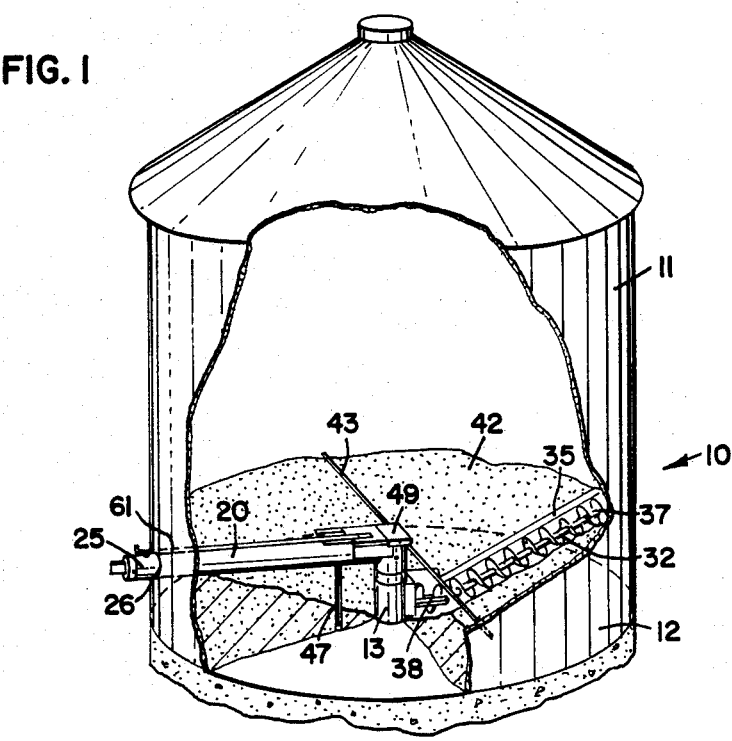
FIG. 1 is a perspective view of the present invention installed within a grain bin.

Referring now to the drawings, the grain storage unloading system of the present invention is shown generally at 10. The grain unloading system 10 is used in conjunction with a grain storage structure 11, which is typically a steel grain bin. The steel grain bin 11 is constructed upon a floor 12, typically a concrete slab floor. The grain bin floor may also be constructed of tin or wood; the present invention can be utilized with all types of grain bin floors, with or without a sump.

A vertical auger conveyer 13 is supported by the floor 12 in the central part of the bin 11. The vertical auger conveyer 13 can be supported upon the floor 12 by a variety of support means 17 readily apparent to those skilled in the art, e.g., by a pin 45 driven into the concrete floor 12 and operatively connected to the vertical auger conveyer 13 by a bracket 46. Interconnected to an upper end of the vertical auger conveyer 13 is a substantially horizontal, discharge auger conveyer 20. The horizontal auger conveyer 20 extends radially from the vertical auger conveyer 13 at the center of the grain bin to the bin wall 11 and through an aperture 26 in the bin wall 11. The horizontal and vertical auger conveyers 20, 13 are interconnected by suitable fasteners or welding.

When the grain bin is substantially full of grain 42, the grain flows by gravity into the top, open end 19 of the vertical auger conveyer 13 and then through the discharge auger 20 to a point outside the bin 11. When the level of grain is low enough so that it no longer flows into the upper end 19, as shown in FIG. 1, the grain is moved up and into the open lower end 18 of the vertical auger conveyer 13, as explained below, from which point it is lifted by the vertical auger conveyer 13 and through the discharge auger conveyor 20.

The vertical auger conveyer 13 includes a substantially cylindrical tube 14 which encloses a lifting auger 15 mounted upon an auger shaft or vertical conveying axis 16. A standard ten inch (25.4 centimeter) auger is preferably used for the lifting auger 15, although other sizes of augers could be utilized. In the preferred embodiment, the top of the vertical auger conveyer 13 is approximately twenty-five inches (0.6 meter) above the floor 12. It is to be understood that the vertical auger conveyer 13 could be any desired height. For example, the vertical auger conveyer 13 can extend upwardly proximate the top of the grain bin 11, and a downwardly sloping discharge chute (not shown) could be connected thereto for discharging the grain by gravity. Alternatively, the discharge auger conveyer 20 can be sloped upwardly so that its outlet end 25 extends through an opening in the grain bin wall near the top of the grain bin 11. The grain 42 could then be unloaded from the discharge spout 25 to a hopper by means of gravity.

The discharge auger conveyer 20 is located several feet above the floor 12 of the grain bin, and may be supported by a vertical post 47 located between the center of the grain bin and bin wall. The horizontal discharge auger conveyer 20 includes a cylindrical tube 23, which contains a discharge auger 21 mounted upon an auger shaft or conveying axis 22. Preferably, a standard eight inch (20 centimeter) auger is used for the discharge auger 21.

An inlet end 24 of the horizontal auger conveyer 20 is suitably interconnected to the upper end 19 of the vertical auger conveyer 13, forming a passageway 30. An outlet end or discharge spout 25 of the horizontal auger conveyer 20 communicates with a point outside the grain bin 11. As shown in FIGS. 1 and 9, the outlet end 25 extends through the opening 26 formed in the wall of the grain bin 11. The outlet end 25 has an aperture (not shown) located at the bottom of the tube 23 through which the grain is discharged, as illustrated by the arrows in FIG. 9. The outlet end 25 of the horizontal auger conveyer 20 may extend outside the wall of the grain bin 11 by several feet. A grain hopper 48 can be located near the discharge spout 25 to collect the grain which is unloaded from the grain bin 11.

Power input for the lifting auger 15 and discharge auger 21 is provided by driving means such as a motor 27 which is operatively attached to the discharge auger shaft 22. In the preferred embodiment, power is provided with a hydraulic motor 27, although other types of motors could be utilized. The hydraulic motor 27 can be driven from tractor or truck hydraulics interconnected by hoses 60, and the hydraulic motor 27 can be used in locations without electricity. In the preferred embodiment, the end of the discharge auger 21 has a removable collar 51 which is interconnected by thumb screws or other suitable fasteners 52. A bracket 50 supports the motor 27 and is interconnected by suitable fasteners or welding to the collar 51. The bracket 50 also has a set of inner 56 and outer 55 apertures through which a pin 54 can be inserted to facilitate proper positioning of the motor 27 and horizontal auger 21, as explained below.

When the discharge auger shaft 22 is activated by the motor 27, the horizontal auger conveyer 20 transports the grain radially outward and through the discharge spout 25. The grain falls into the horizontal auger conveyor 20 by gravity, via the opening 19 and the passageway 30. A conventional right angle gearbox 31, shown in FIG. 2, serves as a means for transmitting power from the horizontal auger shaft 22 to the vertical auger shaft 16, when the vertical auger 13 is needed. The gearbox 31 has an output shaft operatively connected to the vertical auger conveyor and an input shaft operatively connected to horizontal auger conveyor.

Figure 4:
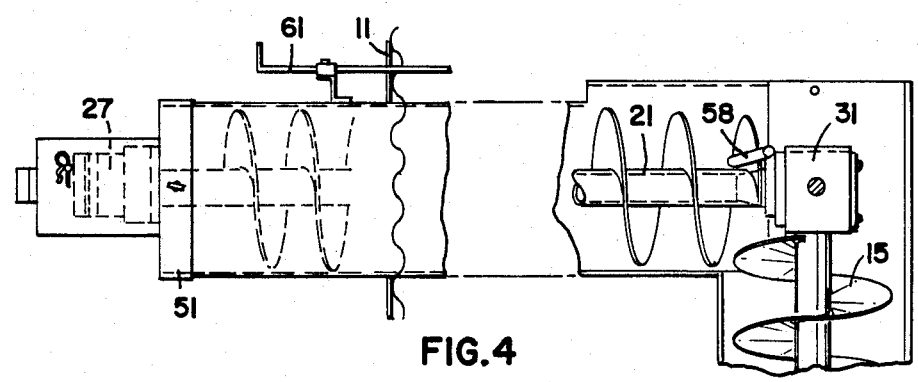
FIG. 4 is a side elevational view of the horizontal and vertical conveyors, with the horizontal auger in an engaged position.
Figure 5:
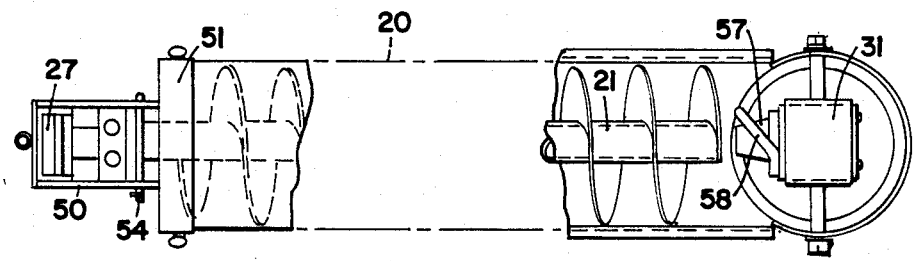
FIG. 5 is a plan view, in section, of the horizontal and vertical conveyors, with the horizontal auger in a disengaged position.
Figure 6:
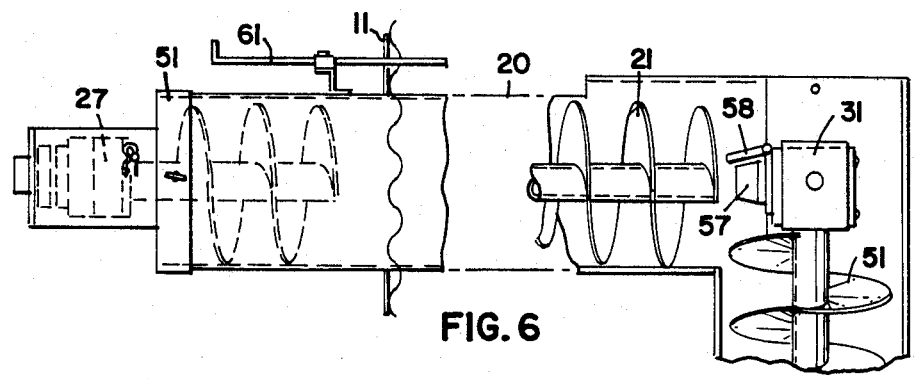
FIG. 6 is a side elevational view of the horizontal and vertical conveyors, with the horizontal auger in a disengaged position.
Figure 7:
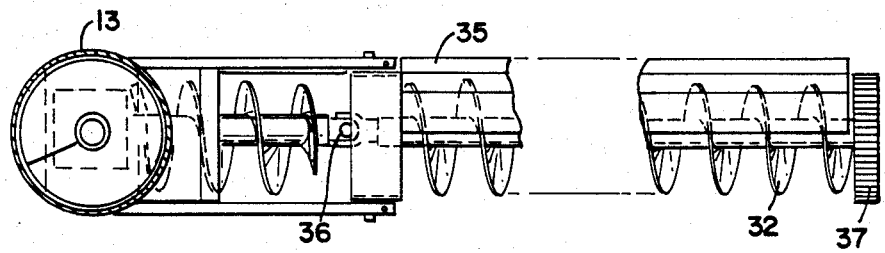
FIG. 7 is a plan view, in section, of the vertical auger, stub auger, and sweep auger of the present invention.
Figure 8:
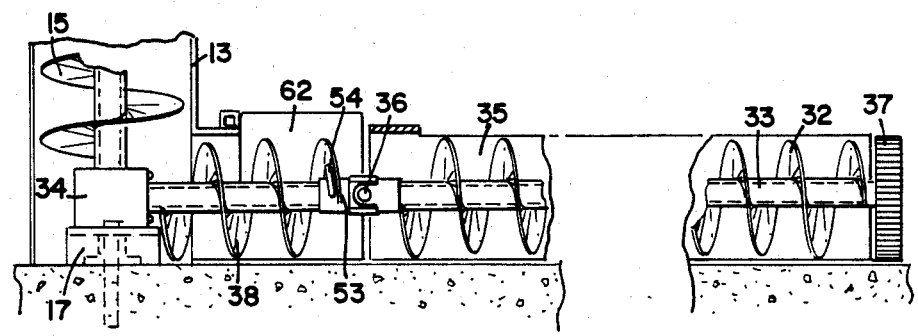
FIG. 8 is a side elevational view, partially in section, of the vertical auger, stub auger, and sweep auger shown in FIG. 7.

Only the horizontal discharge auger conveyor 20 need be operating for most of the grain unloading process. That is, the vertical auger is only activated when the level of the grain is rather low, as shown in FIG. 1. To accomplish this, the horizontal and vertical augers are disengaged from each other when only the discharge auger conveyer 20 is operating. This disengaged position is illustrated in FIGS. 4 and 5, wherein rotation of the discharge auger 21 does not cause rotation of the vertical auger 15, because the horizontal discharge auger 21 is not interconnected to the gearbox 31. This disengaged position is achieved by moving the discharge auger 21 and motor 27 a spaced distance away from the gearbox 31. In the preferred embodiment, the motor 27 is moved within the bracket 50 and secured in an outer position by means of a pin 54 inserted within inner apertures 56 in the bracket 50.

Figure 3:
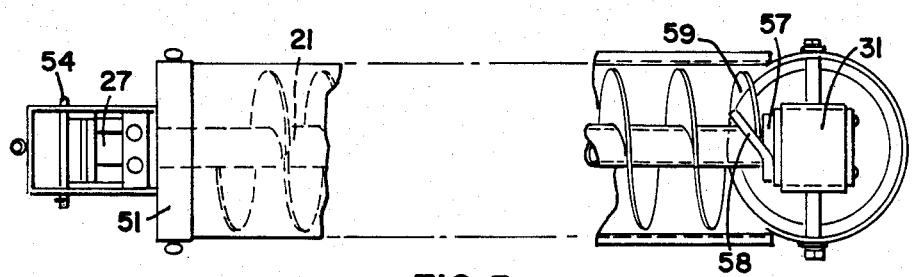
FIG. 3 is a plan view, in section, of the horizontal and vertical conveyors, with the horizontal auger in an engaged position.

When it is necessary for the discharge auger 21 to cause rotation of the vertical auger 15, the discharge auger 21 is placed in an engaged position with respect to the gearbox 31, as illustrated in FIGS. 3 and 4. A wing piece 57 is interconnected to the input gear shaft (not shown) of the gearbox 31. The wing piece 57 has a rod 58 which extends out approximately an inch away from the wing piece 57. When the horizontal auger shaft 22 is positioned against the gearbox 31, the rod 58 of the wing piece 57 contacts or engages with the innermost flight 59 of the discharge auger 21 and is rotated therewith. This engagement of the gearbox 31 and horizontal auger 21 causes the vertical auger 15 to rotate upon activation of the horizontal auger conveyor 21. When the discharge auger 21 is in this inner, engaged position, the motor 27 and discharge auger 21 are positioned against the gearbox 31, as illustrated in FIG. 9. The pin 54 is then engaged within outer apertures 55 in the bracket 50 to maintain the motor 27 in its inner position.

In the preferred embodiment, the discharge auger 21 is removable from the tube 23 of the horizontal auger conveyor 20. The collar 51 and motor support assembly 50 are removed so that the discharge auger 21 can be pulled out of the tube 23 from the outside of the grain bin 11. This allows the horizontal auger 21 and motor 27 to be installed within the unloading systems of several different grain bins, without the necessity of purchasing multiple augers 23 and motors 27.

In the preferred embodiment, a cover 49 is provided for placement over the opening 19 when the grain 42 reaches a relatively low level and the vertical auger conveyor 13 is activated. The cover 49 is interconnected to the upper end of the horizontal tube 23 in the preferred embodiment. A pull rod 61 is interconnected to one end of the cover 49 and extends to the outside of the grain bin 11. The operator can therefore open and close the cover 49 by movement of the pull rod 61 from outside the grain bin 11.

The present invention also includes support rods 43. Preferably, the support rods 43 extend across the diameter of the grain bin and are interconnected to the vertical and horizontal auger conveyers 13, 20. The support rods 43 serve to keep the auger conveyers 13, 20 in proper position and prevent crowding of the grain 42 onto the components of the unloading system.

Figure 2:
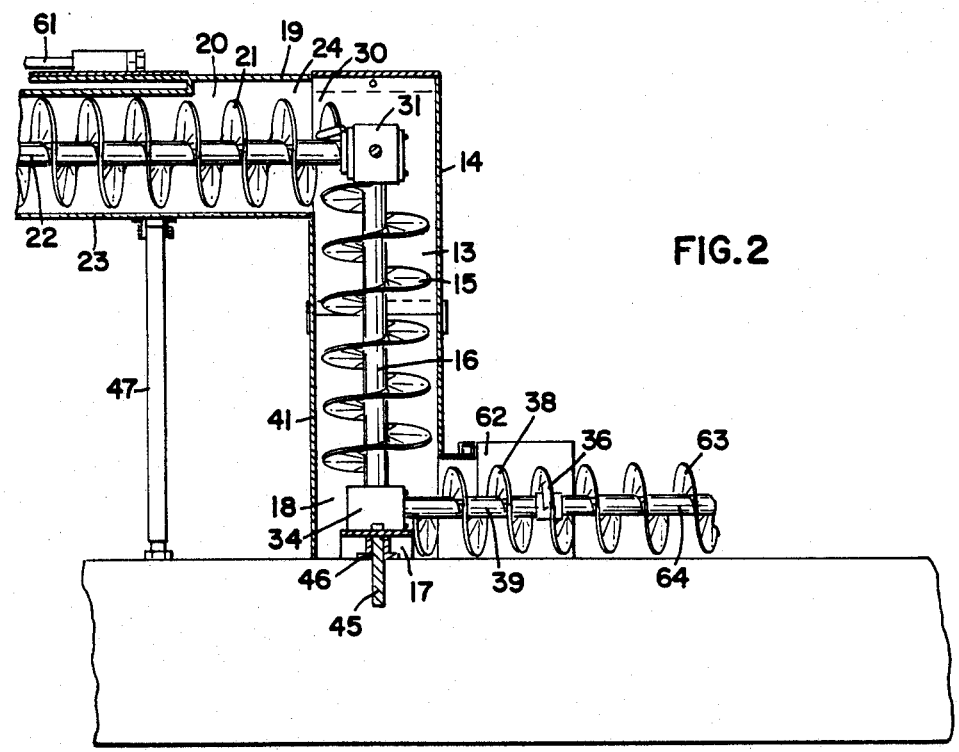
FIG. 2 is a side elevational view, partially in section, of the vertical auger conveyer, stub auger, and mini-sweep auger of the present invention.

As shown in FIG. 2, a "stub" auger 38 is mounted to the lower end 18 of the vertical auger conveyer 13. The stub auger 38 is horizontal and positioned slightly above the floor 12. In the preferred embodiment, there is a shield 62 on at least one side of the stub auger 38. The stub auger 38 is mounted upon a central horizontal shaft or conveying axis 39. Preferably, the stub auger 38 is permanently installed within the grain bin 11. The stub auger 38 is activated in conjunction with activation of the vertical auger conveyor 13. The stub auger 38 serves to force the grain into an aperture in the bottom portion of the vertical auger tube 14, so that it can be carried up by the flighting of the vertical auger 15.

A conventional right angle sweep auger gearbox 34 transmits power from the vertical auger shaft 16 to the stub auger shaft 39. The gearbox 34 has an output shaft operatively connected to the stub auger 38 and an input shaft operatively connected to the vertical auger shaft 16. When the vertical auger assembly 13 activates the stub auger 38, grain will be carried radially inward along the mini-sweep auger's axis 39.

When the level of grain 42 in the bin is rather low, a "mini-sweep" auger 63, illustrated in FIG. 2, is attached to the outer end of the stub auger 38 in the preferred embodiment. The mini-sweep auger has a central horizontal shaft 64 or conveying axis 64. The mini-sweep auger 63 is preferably approximately three or four feet (0.9 to 1.2 meters) in length. The length of the mini-sweep auger 63 can vary according to the power available and the size of the grain bin 11. It is preferable that the mini-sweep auger 63 revolve around the central axis of the vertical auger 13 and that the lower tube portion 41 of the vertical auger tube 14 be made rotatable to move around as the mini-sweep auger 63 rotates. Although the mini-sweep auger is an optional component of the unloading system 10, it greatly minimizes or eliminates shoveling by the operator in order to install the sweep auger 32.

Another feature of the present invention i a sweep auger 32. The sweep auger 32 is preferably mounted on the outer end of the stub auger 38 just above the floor 12, in the same manner that the mini-sweep auger 63 was mounted, such that it can revolve around the grain bin 11 circumferentially. The length of the sweep auger 32 preferably extends the entire radius of the grain bin, as shown in FIG. 1. The sweep auger 32 serves to draw grain 42 radially from the outer portions of the grain bin 11 for transport up and out the vertical and horizontal conveyors 13, 20. The lower portion 41 of the vertical auger conveyer 13 is configured to be rotatable in order to follow the path of either the sweep auger 32 or mini-sweep auger 38.

Rotation of the mini-sweep auger 63 and the sweep auger 32 is driven by rotation of the stub auger 38. In the preferred embodiment, the shaft of the stub auger 38 fits within an end piece 53 of the sweep auger interconnected to the shaft 33 of the sweep auger. The sweep auger 32 and stub auger 38 are interconnected by a suitable connector piece 54. When the mini-sweep auger 63 is attached to the stub auger 38, it is attached in a similar manner.

Located at the outer end of the sweep auger's shaft 33 is a drive wheel 37 which supports the outer end of the sweep auger 32. The drive wheel 37 rotates with the sweep auger shaft 33 and rides along the top of the grain pile 42. The sweep auger 32 is connected with the stub auger 38 by means of a universal joint 36. The universal joint 36 allows the sweep auger 32 to pivot vertically as the height of the grain in the bin varies, as shown in FIG. 1. The sweep auger 32 revolves around the grain bin by means of the drive wheel 37 and the tendency of the auger 32 to dig itself into the grain and rotate. The sweep auger 32 is relatively light and can be installed by only one person. The sweep auger 32 and mini-sweep auger 63 are not permanently installed within the grain bin, but can be moved from bin to bin to reduce expenses. The mini-sweep auger 63 clears grain from the central portion of the bin 11, thus facilitating installation of the sweep auger 32.

The sweep auger 32 also includes a longitudinal shield 35 on at least one side of the auger to facilitate the radially inward movement of the grain and to prevent the grain from flying out. An inner shield (not shown) for the mini-sweep auger 38 is also provided in the preferred embodiment.

An alternate use of the present invention would be to remove the auger 21 within the horizontal tube 23, and to provide the horizontal tube 23 with a plurality of small holes. A blower mounted on the outlet end 25 of the horizontal tube 23 can then blow air into the tube 23 in order to dry the grain 42 within the bin 11.

In operation, the vertical auger conveyer 13 and the tube 23 of the horizontal auger conveyer 20 are installed within the grain bin 11 before the grain is loaded. In the preferred embodiment, the stub auger 38 is also installed at that time. When the grain 42 in the bin 11 is ready to be unloaded, the operator installs the discharge auger 21 within the horizontal tube 23 and positions the motor arrangement 27 such that the horizontal auger conveyor 20 is in the disengaged position with respect to the gearbox 31. The operator activates the motor 27, which causes the horizontal auger conveyer 20 to be activated. The cover 49 is moved so that the horizontal auger 20 has an inlet aperture 19. The grain 42 flows by gravity into the upper opening 19 through the horizontal auger conveyor 20, and out the discharge spout 25.

When the level of grain becomes relatively low and no longer flows into the upper opening 19, the horizontal discharge auger 21 is deactivated and the lid or cover 49 is positioned over the opening 19. The mini-sweep auger 63 is then attached to the end of the stub auger 38. The horizontal auger conveyor 20 is placed in engagement with the gearbox 31, thereby allowing the vertical auger conveyer 13 and the mini-sweep auger 38 to be activated. The mini-sweep auger 38 revolves around the vertical auger conveyor 13, moving the grain inwardly. The grain moves up from the bottom opening 18 of the vertical auger conveyer and out the horizontal auger conveyor 20. The mini-sweep auger 38 serves to clear grain from the central area surrounding the vertical auger conveyer 13, thus facilitating the installation of the large sweep auger 35. The grain moves through the horizontal auger conveyer 20 to a discharge chute 25 located at a point outside the grain bin 11. When a majority of the grain has been passed outside of the grain bin 11, a sloped quantity of grain around the edges of the bin will remain, as illustrated in FIG. 1. At that time, the operator removes the minisweep auger 63 and installs the sweep auger 32, which extends to the wall of the grain bin 11. The sweep auger's universal joint 36 allows the sweep auger 32 to be angled upwardly and travel upon the sloped pile of grain. As the sweep auger 32 revolves, it gradually works it way down to the floor 12 as the grain is sent radially inwardly and outside the grain bin 11.

Even though these numerous characteristics and advantages of the invention have been set forth in the foregoing description, together with details of the structure and function of the invention, the disclosure is illustrative only, and changes can be made in detail, especially in matters of shape, size and arrangement of parts, within the principles of the invention, to the full extent indicated by the broad general meaning of the appended claims.

What is claimed is:

1. Apparatus for unloading grain from a storage bin having a floor, comprising:
   (a) a discharge auger conveyor having a first auger, said discharge auger conveyor having an inlet end portion located at a first point inside said bin and an opposite outlet end communicating with a second point outside said bin;
   (b) means for supporting said discharge auger conveyor including said inlet end portion spaced above said floor;
   (c) means for conveying to said inlet end portion said grain incapable from flowing under the influence of gravity to said inlet end portion, said conveying means including a second auger;
   (d) means for driving said first auger; and
   (e) means for disconnectably coupling said first and second augers so that when said first and second augers are uncoupled, said grain is unloaded by only said first auger and when said first and second augers are coupled, said grain is unloaded by said second auger feeding said first auger, wherein said grain unloading apparatus is located completely above said floor so that said apparatus can be installed in a previously constructed bin having a floor.

2. Apparatus according to claim 1, wherein said discharge auger conveyor includes a first tube receiving said first auger, and said conveying means includes a second tube receiving said second auger, said second tube having one end proximate the floor of the bin, said supporting means including an opening in the wall of said bin for supporting said outlet end of said discharge auger conveyor and means for fastening said first tube to said second tube means for supporting said inlet end portion of said discharge auger conveyor.

3. Apparatus according to claim 1, wherein said discharge auger conveyor includes a first tube receiving said first auger and said inlet end portion includes means along said first tube for closeably accessing said first auger so that when said coupling means is disconnected, said grain can flow through said accessing means to be unloaded by said first auger.

4. Apparatus in accordance with claim 3, wherein said coupling means includes gear means fixedly connected to said second auger and means for engaging said first auger fixedly attached to said gear means, said coupling means further including first means for securing said first auger spaced from said engaging means and second means for securing said first auger connected with said engaging means.

5. A method for unloading grain for a storage bin, comprising the steps of:
   (a) unloading a first portion of said grain with a fixed position, first auger;
   (b) sliding said first auger into engagement with means for coupling to a fixed position, second auger;
   (c) unloading a second portion of said grain with a second auger which transports grain to said first auger;
   (d) connecting one end of a moveable third auger to said second auger, said third auger having a second end; and
   (e) unloading a third portion of said grain while rotating the second end of said third auger about said second auger.

6. The method according to claim 5, including before said first unloading step the step of opening means for accessing an inlet end of said first auger and, following said first unloading step, the step of closing said accessing means.

7. The method according to claim 5, wherein said connecting step occurs before said first unloading step and said second and third unloading steps occur simultaneously, said method including the further steps of connecting one end of a fourth auger through a universal joint to said third auger and unloading a fourth portion of said grain while rotating said third auger and said fourth auger about said second auger.

* * * * *